US 6,609,247 B1
Aug. 19, 2003

(12) United States Patent
Dua et al.

(54) METHOD AND APPARATUS FOR RE-CREATING THE TRACE OF AN EMULATED INSTRUCTION SET WHEN EXECUTED ON HARDWARE NATIVE TO A DIFFERENT INSTRUCTION SET FIELD

(75) Inventors: Anuj Dua, San Jose, CA (US); Russell Clarence Brockmann, Fort Collins, CO (US); Susith Rohana Fernando, Fort Collins, CO (US); Kevin David Safford, Fort Collins, CO (US)

(73) Assignee: Hewlett-Packard Development Company, Houston, TX (US)

( * ) Notice: Subject to any disclaimer, the term of this patent is extended or adjusted under 35 U.S.C. 154(b) by 0 days.

(21) Appl. No.: 09/506,774

(22) Filed: Feb. 18, 2000

(51) Int. Cl.⁷ ............................. G06F 9/44; G06F 15/00
(52) U.S. Cl. .......................... 717/128; 712/23; 712/227
(58) Field of Search .................... 717/128, 124–127, 717/129–135; 712/226–248, 23, 224, 24–25, 28, 32, 216; 703/13–28; 714/28–35, 38; 710/268

(56) References Cited

U.S. PATENT DOCUMENTS

| | | | | |
|---|---|---|---|---|
| 5,751,942 A | * | 5/1998 | Christensen et al. | 714/38 |
| 5,859,999 A | * | 1/1999 | Morris et al. | 712/224 |
| 5,860,017 A | * | 1/1999 | Sharangpani et al. | 712/23 |
| 5,944,841 A | * | 8/1999 | Christie | 714/38 |
| 6,145,123 A | * | 11/2000 | Torrey et al. | 717/128 |
| 6,163,764 A | * | 12/2000 | Dulong et al. | 703/26 |
| 6,182,210 B1 | * | 1/2001 | Akkary et al. | 712/235 |
| 6,240,509 B1 | * | 5/2001 | Akkary | 712/228 |
| 6,463,522 B1 | * | 10/2002 | Akkary | 712/216 |
| 6,467,083 B1 | * | 10/2002 | Yamashita | 717/128 |
| 6,470,408 B1 | * | 10/2002 | Morrison et al. | 710/268 |
| 6,496,925 B1 | * | 12/2002 | Rodgers et al. | 712/244 |

OTHER PUBLICATIONS

Dulong, The IA–64 architecture at work, Jul. 1998, Computer, vol. 31, pp. 24–32.*
Story–Tang, New Algorithms for Improved Transcendental Functions on IA–64, Apr. 1999, Proceedings 14th IEEE Symposium on Computer Arithmetic.*
Larin–Conte, Compiler–driven cached Code compression Schemes for Embedded ILP Processors, Nov. 1999, Proceedings 32nd Annual International Symposium on Microarchitecture, pp. 82–92.*
Bharadwaj–Menezes–McKinsey, Wavefront Scheduling: Path Based Data representation and Scheduling of Subgraphs, Nov. 1999, Proceedings 32nd Annual International Symposium on Microarchitecture, pp. 262–271.*
Wolfe, A., "Patents shed light on Merced's Innards", Electronic Engineering Times, Feb. 15, 1999.

* cited by examiner

*Primary Examiner*—Hoang-Vu Antony Nguyen-Ba

(57) ABSTRACT

A method and an apparatus for re-creating a trace of instructions from an emulated instruction set when running on hardware optimized for a different instruction set, such as IA-32 instructions running on an IA-64 machine, are disclosed. An execution trace buffer is created that maintains desired information about instructions as they are executed and retired. The invention may be configured such that certain desired information helpful to debugging the system may be written to the buffer as the instructions are retired. This information may include the addresses of sequential or branch instructions, or other relevant information that can be gathered continuously and non-intrusively as instructions are executed. The information may be read from the buffer and output in a machine-visible form at the user's convenience.

19 Claims, 4 Drawing Sheets

METHOD AND APPARATUS FOR RE-CREATING THE TRACE OF AN EMULATED INSTRUCTION SET WHEN EXECUTED ON HARDWARE NATIVE TO A DIFFERENT INSTRUCTION SET FIELD

FIELD

The technical field relates to digital computer systems debugging. More particularly, it relates to methods and an apparatus for debugging IA-32 systems running on an IA-64 CPU.

BACKGROUND

In the field of computer architecture, it is desirable to provide means of debugging systems. This is especially true in mixed architectures, such as the IA-64 architecture, which supports two instruction sets—the IA-32 variable length instruction set and the enhanced mode (EM) instruction set. A single machine, such as an IA-64 microprocessor, may process instructions from both these instruction sets. In debugging problems with processor execution, it may become necessary to investigate the sequence of instructions executed immediately prior to the problem. With respect to the IA-64 machine, it is desirable to provide debugging methods for IA-32 or x86 instructions, as well as native instructions.

Various methods exist by which computer systems may be debugged. For example, some central processing units (CPUs) provide debug hints in the form of "branch trace messages." These branch trace messages send out a special signature (e.g., source, destination address of branch) on the processor bus. One debugging technique uses "breakpoints" that cause the CPU to respond in a certain specified way when a certain instruction is executed. In order to gather information about the architectural state of the machine using a breakpoint, it is necessary to stop the machine at the breakpoint. While some techniques like "Sample-on-the-Fly" allow a portion of the machine state to be sampled while a program executes, the information recorded is overwritten in each new cycle, giving no temporal information about the execution history. Scan methods have been employed to interrogate the internal state of the machine by stopping the CPU for a clock cycle, scanning the processor state, and sending it to a system-visible entity such as a processor bus or register. The CPU is clocked for a cycle, new state information gathered and the process repeats.

The problem with existing debug methods is that they are slow, complex, and intrusive. These debug techniques require stopping the program, reading all of the information, and then continuing the program. Also, some debug techniques require some knowledge about the failing condition. For instance, the breakpoint technique requires identifying a breakpoint in the vicinity of the suspected problem (for example, a range of instruction addresses) and examining the CPU state when the machine halts at the breakpoint. This is largely a process of trial and error—making an educated guess regarding the location of the breakpoint, re-executing certain instructions, and determining whether the error exists. Sometimes the very act of setting up a breakpoint may perturb the machine state enough such that the error is masked.

Also, existing debug techniques do not allow the user to efficiently switch modes of operation. That is, traditional methods may allow the user to analyze both macroinstructions and microinstructions, but not by the same method.

What is needed is a better way of accessing the execution history. In particular, what is needed is a non-intrusive means of gathering instruction information as the instructions execute without stopping the machine to set a breakpoint or to scan particular nodes.

SUMMARY

A method for creating a trace of emulated instructions from an emulated instruction set when running on hardware optimized for a different instruction set, such as IA-32 instructions running on an IA-64 machine is described. An execution trace buffer is created that maintains desired information about instructions as they are executed and retired. A system may be configured such that certain desired information helpful to debugging the system may be written to the buffer as the instructions are retired. This information may include the addresses of sequential or branch instructions, or other relevant information that can be gathered continuously and non-intrusively as instructions are executed. The information may be read from the buffer and output in a machine-visible form at the user's convenience.

A computer system capable of creating an easily readable execution history by using an execution trace buffer. The execution trace buffer maintains certain information about instructions as they are executed and retired. The computer system may be configured such that certain desired information helpful to debugging the system may be written to the buffer as the instructions are retired. This information may include the addresses of sequential or branch instructions, or other relevant information that can be gathered continuously and non-intrusively as instructions are executed. The information may be read from the buffer and output in a machine-visible form at the user's convenience.

DETAILED DESCRIPTION

A method and apparatus are described for re-creating a trace of instructions from an emulated instruction set when running on hardware optimized for a different instruction set by using an "execution trace buffer" (ETB) 40. By way of illustration only and not by way of limitation, the method is explained in the context of IA-32 programs running on an IA-64 CPU. One skilled in the art will recognize that the method and apparatus of the present invention extend beyond these architectures and can be implemented in any system processing emulated instructions on the native hardware of a different instruction set. All references to x86 and IA-32 are intended to refer generally to any sort of emulated instruction set architecture (ISA). Likewise, all references to the IA-64 architecture are intended to refer generally to any sort of native ISA. Because the x86 architecture is designed to execute instructions from the IA-32 instruction set, those terms are used interchangeably.

The ETB 40 captures x86 instruction execution history. Unlike most existing methods, the history is obtained non-intrusively. In operation, the ETB 40 gathers preselected data about instructions as they execute, regardless of whether any error occurs. Unlike existing methods, the present invention gathers instruction data "on the fly," without halting the operation of the program. Then, when an error does occur, the user can access the ETB 40 to read the series of instructions executed immediately before the error occurred. The ETB 40 provides a window into the execution history of the x86 engine 20, displaying the most recently executed instructions whenever the user needs them. The operator debugging the system—either the hardware or the software—can simply issue a set of instructions to read the ETB 40 to determine which instructions issued immediately prior to a problem.

In one embodiment, the system also operates in multiple, pre-selectable modes, depending upon the instruction information desired. The system also gathers information about both macroinstructions and microinstructions. In one embodiment, the system also allows the user to customize the information retrieved.

The IA-64 instruction set is a combination of the enhanced mode (EM) and IA-32 instruction sets. The EM instruction set defines a set of fixed-length 64-bit instructions that execute on native EM hardware. The IA-32 instruction set includes variable-length instructions. These variable-length IA-32 instructions are also referred to as "macroinstructions." The macroinstructions are decomposed by the x86 engine 20 into native EM instructions, which are also referred to as "microinstructions" when operating in x86/IA-32 mode. The execution of each IA-32 instruction is achieved by executing a series of EM microinstructions. The ETB 40 provides a means of tracing the execution history of either microinstructions or macroinstructions.

Figure 1:
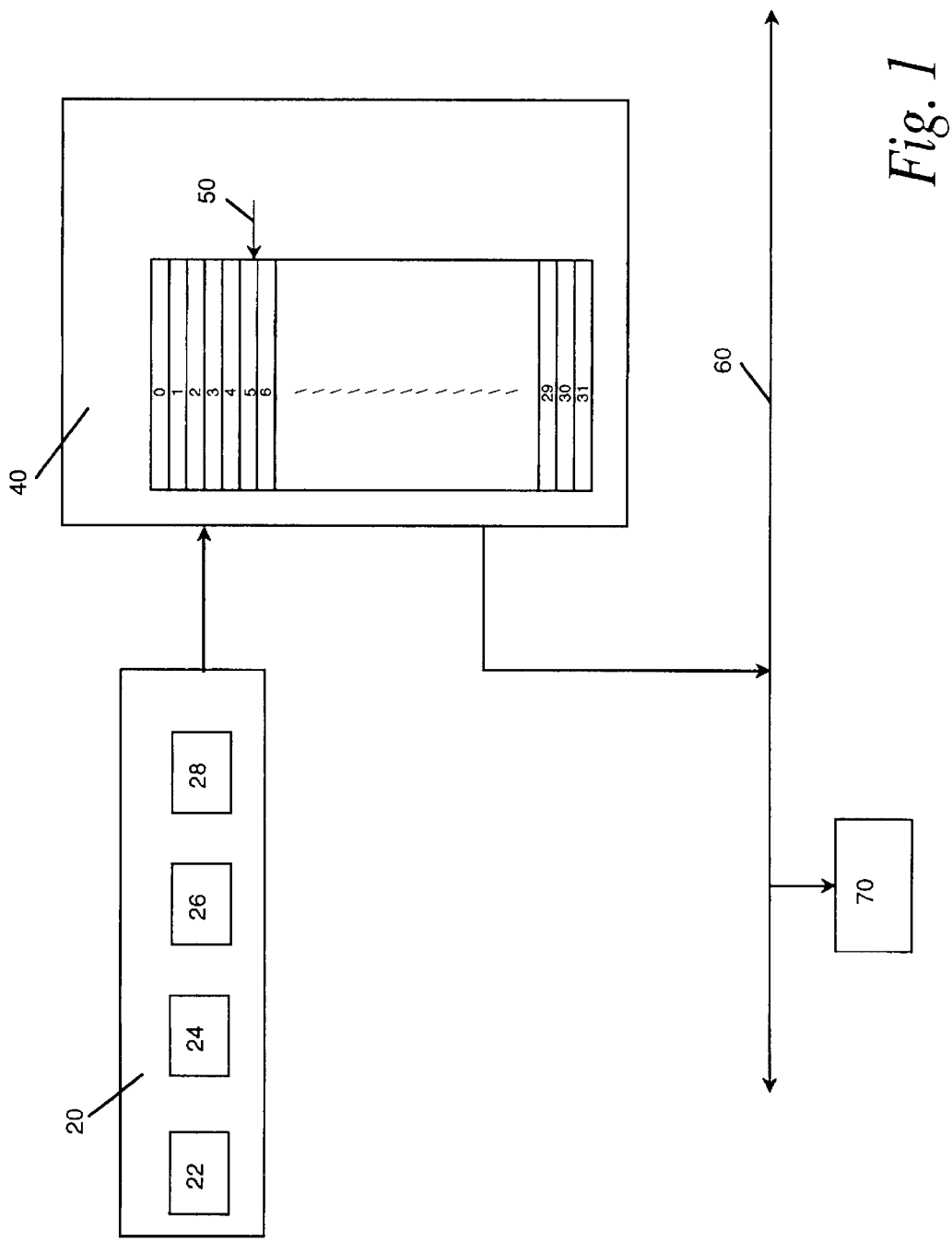
FIG. 1 is a block diagram of the system hardware.

FIG. 1 shows a computer system 10, having an x86 engine 20 and an ETB 40. The function of the x86 engine 20 can be broadly broken down into four distinct stages the fetch stage 22, the decode stage 24, the execute stage 26, and the retire stage 28. In the embodiment shown in FIG. 1, the ETB 40 has 32 entries, numbered 0 through 31. A generic entry 42, also referred to as "slot x," is indicated on FIG. 1 for further description. The retire stage 28 of the x86 engine 20 writes certain, predetermined information to the ETB 40. The ETB 40 has a pointer 50 which indexes one of the 32 possible ETB entries, e.g. 42. The ETB 40 is treated as a model-specific register (MSR), each slot of which can be written to or read from, depending on the position of the ETB pointer 50. As shown in the embodiment of FIG. 1, the pointer 50 may be initialized to point to entry 0 at reset. It increments after each write and eventually wraps around from 31 back to 0 in a circular fashion.

FIG. 1 also shows that the ETB 40 may be read into a machine-visible general purpose register 70 using techniques known to those skilled in the art. In the embodiment shown in FIG. 1, the ETB 40 can be read onto a result bus 60. The result bus 60 can be used to transport control and debug register information to various parts of the CPU 10. In debug mode when a read operation is issued to the ETB 40, the entry pointed to by the ETB pointer 50 is read into the specified target general-purpose register 70, and the ETB pointer 50 is advanced. Thus, by issuing a series of 32 read operations from the ETB 40, the execution history captured on the ETB 40 can be made externally visible.

Figure 2:
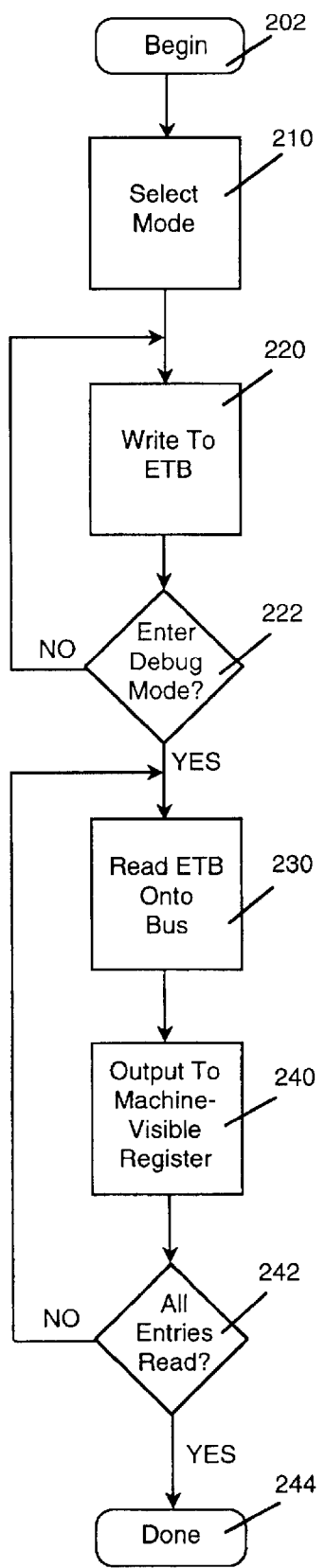
FIG. 2 is a flow chart showing a new method.

FIG. 2 shows a flow chart of the method. First, a mode of operation is selected 210 to determine which type of information will be collected in the ETB 40. Then, the desired information is written 220 to the ETB 40 as the instructions retire. As the machine runs, the ETB 40 continues to collect the information until the user enters debug mode 222. When a problem occurs requiring analysis of the system, the user can read 230 the entries on the ETB 40 by issuing a short loop of read instructions. The information is then read 230 onto the result bus 60 and output 240 to a general purpose register 70, where it can be analyzed. The ETB 40 can continue to be read until all of its entries have been read 242 and the read loop is done 244.

As noted above, the information written to the ETB 40 depends upon the preselected mode of operation. Although the ETB 40 may be configured to retrieve any sort of information from instructions retiring in the x86 engine 20, two types of such information include macroinstruction information and microinstruction information. Within both of these broad categories, the ETB 40 may operate in two sub-modes, depending upon whether all information is requested or just that information relating to a change in program flow. The ETB 40, then, has four main modes of operation classified by the four forms of execution history information traced.

1. Retired Macroinstruction Trace Mode

In this mode, the Virtual 32-bit address (also called a virtual instruction pointer (VIP)) of all successfully retired IA-32 instructions is saved on the ETB 40. The virtual address is an offset from the base of the code segment. The code segment base address in the code segment descriptor and the VIP information from the ETB 40 can provide the linear addresses of all IA-32 instructions executed, when used in this mode.

Figure 3A:
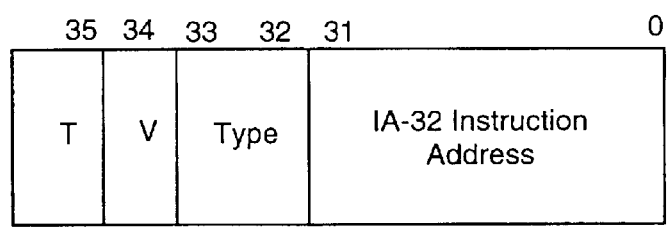
FIG. 3A is a diagram showing a form of the ETB entry when operating in either Retired Macroinstruction Trace mode or Retired Macro-Branch Trace mode.

FIG. 3A shows the form of an ETB entry, e.g. 42, in this retired macroinstruction trace mode. In the embodiment shown, this mode has been numbered mode 10. In the embodiment shown in FIGS. 3A through 3B, the ETB entries are 36-bits wide. In retired macroinstruction trace mode, the entry includes 32 bits of the IA-32 instruction address, a two-bit type entry, a one-bit valid entry, and a one-bit tagged address. The size of the register entry can, of course, be changed to incorporate additional information used in the operation of the system if desired.

In the embodiment shown, the type entry uses 00 to represent a code segment descriptor base address, 01 to represent a target address of a branch instruction, 10 to represent a default or sequential address, and 11 is undefined.

The tag bit allows the user to identify certain instructions in the captured trace that may further assist the debug process. For example, the user may choose to tag certain types of instructions or instructions within a particular address range, so as to easily identify them in the ETB 40. In addition, the tag function may be used to further filter the instructions that will be written to the ETB 40, so as to use the limited ETB entries more efficiently. The use of the tag function to collect information is more fully described herein. For purposes of the register shown in FIG. 3A, it is sufficient to note that the tag bit shows whether or not a particular code was "tagged" by the user.

The valid bit indicates when an entry is valid. As noted, the ETB 40 uses a write pointer 50 to indicate the next available ETB register, e.g. 42, by incrementing after every write function and wrapping around from entry 31 to entry 0, in circular fashion. The write pointer 50 may be configured to initialize itself to entry 0 on power up. As explained herein, at certain times the ETB entries, e.g., 42, are cleared, such as during the transition from EM mode to x86 mode. When this transition occurs, the pointer 50 does not return to entry 0, in one embodiment, yet the information must all be cleared, and a new execution trace gathered. To accomplish this, one embodiment of the present invention uses a valid bit and sets that bit to zero to indicate that the entry is not valid. The valid bit for an entry is then set when a new entry is written.

2. Retired Macro-Branch Trace Mode

In this mode, all IA-32 instructions that result in a change in program flow (taken conditional and unconditional jumps, calls, and returns) are recorded on the ETB 40. For these instructions, both the address of the branch and the branch target are recorded on the ETB 40. This allows greater execution history to be recorded, as the addresses between the last branch target and the next branch source are implied to be sequential. In addition, for far branches that result in a change to the code segment base, the old code segment base is recorded on the ETB 40. The type field associated with each entry distinguishes the entry as either a source address, a target address, or a code segment base address.

FIG. 3A also shows the form of an ETB entry in this mode. In the embodiment shown, this mode has been numbered mode 00. The entries in the register are the same as those used in retired macroinstruction trace mode. However, the type codes are somewhat different. In the embodiment shown, the type entry uses 00 to represent a code segment descriptor base address, 01 to represent a source address, 10 to represent a destination address, and 11 is undefined.

3. Retired Microinstruction Trace Mode

The x86 engine 20 includes a microcode ROM that decomposes macroinstructions into microinstructions. Each microinstruction that is executed in the x86 engine 30 is identified by a unique address within the microcode ROM, called the micro-ip. This mode allows recording of all retiring micro-ips on the ETB 40. Since the x86 engine 30 can execute a maximum of two microinstructions per clock, two micro-ips are written to the ETB entry during each allocation cycle. Since the micro-ips are usually smaller in width compared to the IA-32 macroinstruction addresses (32 bits), as many as 2 micro-ips and two valid bits (one per retiring microinstruction) can be recorded.

Figure 3B:
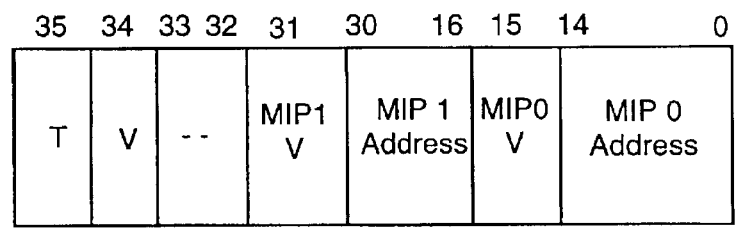
FIG. 3B is a diagram showing a form of the ETB entry when operating in either Retired Microinstruction Trace mode or Retired First Micro-ips of New Flows Trace mode.

FIG. 3B shows the form of an ETB entry in this mode. In the embodiment shown, this mode has been numbered mode 11. The embodiment shown for this mode includes a 15-bit micro-ip 0 address, a one-bit micro-ip 0 valid entry, a 15-bit micro-ip 1 address, a one-bit micro-ip 1 valid entry, one-bit valid entry, and a one-bit tagged address. In the embodiment shown, two bits are left undefined when in retired microinstruction trace mode.

4. Retired First Micro-ips of New Flows Trace Mode

This mode is analogous to the Macro-Branch Trace mode, in that it attempts to capture changes in the execution flow of micro-operations. When a non-sequential operation occurs, the micro-ips of the first two micro-operations of each new macroinstruction are captured on the ETB as they retire. In addition, micro-ips of the first microcode line of flow that are executed as a result of a back-end exception in the machine are captured as well. The information in this mode is the same as in mode 3. Two micro-ips and 2 valid bits are allocated for each entry.

FIG. 3B also shows the form of an ETB entry in this mode. In the embodiment shown, this mode has been numbered mode 01. The ETB register entries in this mode are the same as in retired microinstruction trace mode.

Depending upon the mode selected, each entry, e.g. 42, in the ETB 40 is written when a macroinstruction or a microinstruction retires in the x86 engine 20. In addition to the various ETB data fields, a valid bit is set for each entry written. In one embodiment, information is written to the ETB 40 only when operating in x86 or IA-32 mode, and not in the native EM mode. When the processor transitions from EM mode to x86 mode, the entries in the ETB 40 are cleared. That is, the valid bits are set to zero. When the processor transitions from x86 mode to EM mode, the entries in the ETB 40 remain unchanged, but no information is written in EM mode. The reading of the ETB 40 is performed in EM mode, so no information is destroyed in this transition.

In use, the ETB 40 collects information regarding the most recent 32 macroinstructions or pair of microinstructions of the type selected, as those instructions retire, without disrupting the processor. To debug an error, the ETB 40 is read in the EM mode of execution by issuing a series of 32 read commands to the ETB 40. Each read command places the result of the entry indexed by the pointer 50 into a general purpose register 70. The pointer 50 is incremented after each read operation is complete. A series of 32 read operations from the ETB 40 will result in a recreation of the trace addresses in chronological order. A sample read loop in pseudo code may read as follows:

```
mov r30=0x00
    //initialize counter
    READ inc r30
        //increment counter
        mov r5=msr[ETB]
    //read ETB entry
        cmp.eq p1,p2=r30,32  //all 32 entries read? if so,
            DONE
        (p2) br.cond.sptk READ
        //continue reading if not all 32 read
DONE
```

The present invention may be configured to operate in a default mode. For example, the default mode may be set such that the addresses of all retiring x86 macroinstruction branches are deposited on the ETB 40. While the processor executes the instructions, the ETB 40 simultaneously tracks those instructions. It should be appreciated that the ETB 40 provides a simpler and quicker way of accessing the execution history of either microinstructions or macroinstructions, but that traditional debugging methods are not precluded by the ETB 40. The ETB 40 may be used in conjunction with other traditional methods.

While each entry contains address information about the microinstructions or macroinstructions that are executed, any information associated with the retiring operation that could help in debugging can be written. In one embodiment, the present invention writes the fields shown in FIGS. 3A and 3B. These fields may help further narrow the source of the problem. For example the type field may indicate whether the failure occurred soon after a branch and if so, whether the last instruction retired was the target of the branch or the branch itself. The width of each entry of the ETB 40 is limited by physical implementation constraints. To use the ETB entries more efficiently, the present embodiment uses the machine's tagging capability to filter the type of instruction information collected by the ETB 40. For example, the user could collect only those instructions having particular operation codes (e.g., add instructions) or a class of codes (e.g., arithmetic instructions) or those instructions within a particular address range. The tag bit associated with an executing macro or micro instruction is set when the predetermined condition is met, and cleared if not met. When the instruction retires, the tag bit is written along with the instruction address in the present embodiment. In addition, by setting a programmable control bit in the machine—called the 'tag enable' bit 110, the user can set up the machine so that only operations that have the tag bit set are written to the ETB 40.

Figure 4:
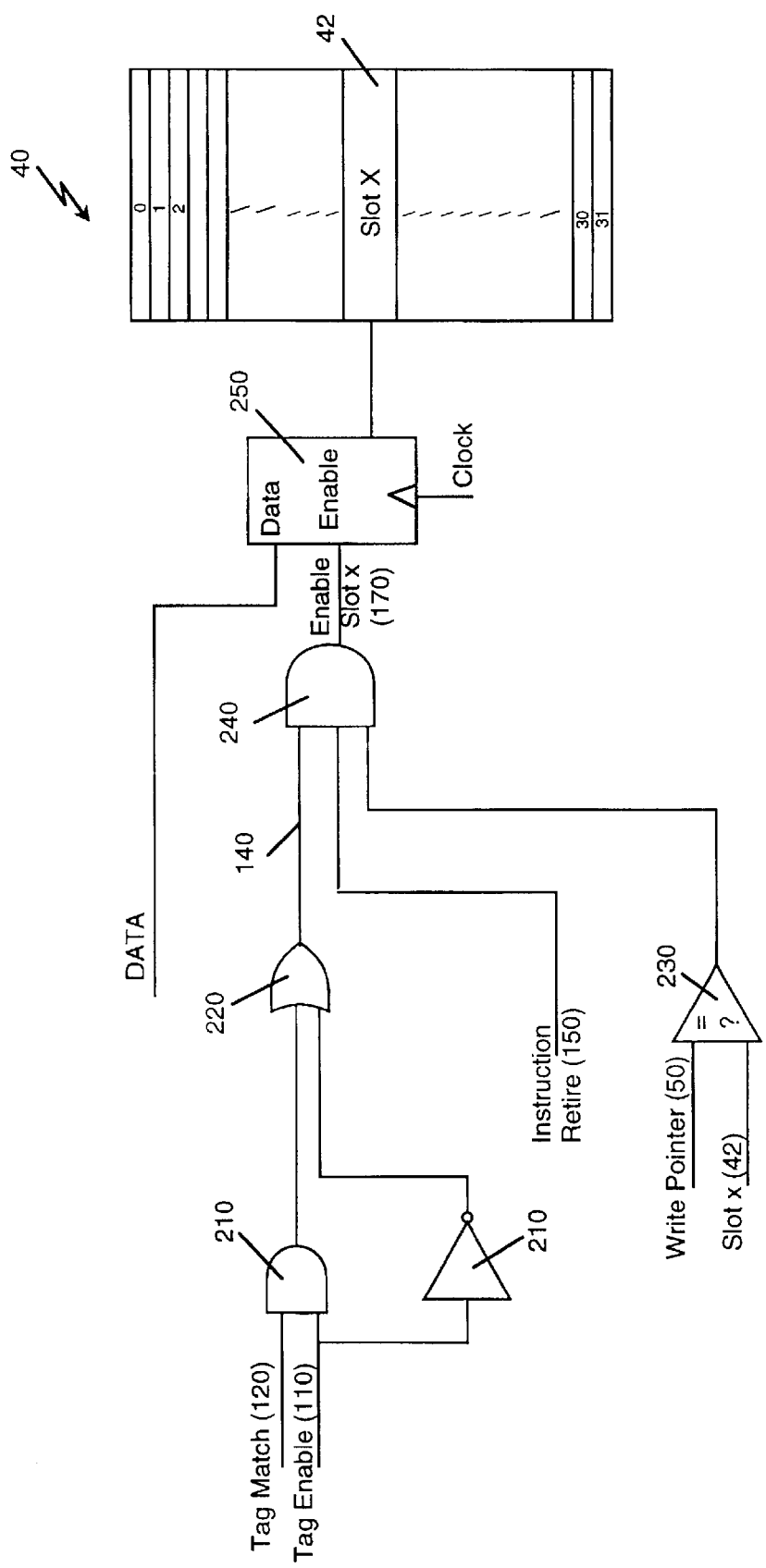
FIG. 4 is an example diagram showing part of the logic circuitry used to write information to the ETB.

FIG. 4 shows an example logic that may be employed in the ETB write portion of one embodiment. FIG. 4 shows the logic that might go into a particular ETB entry 42, also denoted as "slot x." In the example of FIG. 4, only the logic for slot x42 is shown, but it should be appreciated that similar logic would be used by every slot, e.g., 42 of the ETB 40 to control the writing of data to the ETB 40. The preselected data is written to slot x42 of the ETB 40 through a flip-flop 250, which is enabled by an enable slot x output 170, which is the output of a series of logic gates. Specifically, in the embodiment of FIG. 4, data is only written to slot x42 if: (1) an instruction retires, (2) the writer pointer 50 points to slot x42, and (3) an allocate enable signal 140 has been issued. The write pointer 50 is incremented on every write to the ETB 40. The pointer is compared to slot x42 to determine if slot x42 is the next entry to be written, using a comparator 230. The instruction retire signal 150 triggers every time a macroinstruction or one or more microinstructions in the x86 engine 20 retires. The allocate enable signal 140 relates to the tag function. If the tag enable bit is set, only those instructions having the associated tag match bit set will be written to the ETB. Otherwise, depending on the mode selected, any retiring instruction(s) as indicated by the instruction retire signal will be written. Of course, any other function could be used to control the allocate enable bit 140, and any other function could further qualify the slot x enable bit 170.

It should be recognized by those skilled in the art that these embodiments provide an advantageous method and apparatus for debugging IA-32 instructions on a chip processing more than one type of instruction set and for allowing debugging while the processor is in EM mode. In particular, one skilled in the art will recognize that the present invention provides a non-intrusive means of gathering instruction data while a program is operating for use later, during debug. It should also be recognized that the system allows the collection of information relating to both macroinstructions and microinstructions.

Although the invention has been described in detail with reference to certain embodiments thereof, variations are possible. For example, although the sizes and formats of certain data, registers, stacks, buffers, logic circuitry, code, and other certain specific information were given as examples, these examples were by way of illustration only, and not by way of limitation. The invention may be embodied in other specific forms without departing from the essential spirit or attributes thereof. It is desired that the embodiments described herein be considered in all respects as illustrative, not restrictive, and that reference be made to the appended claims for determining the scope of the invention.

What is claimed is:

1. A method for debugging a system in a processor comprising:

executing a plurality of instructions with an execution engine;

retiring the instructions from the execution engine after the instructions are executed, wherein the executing comprises executing some of the instructions while retiring others of the instructions;

writing information regarding the instructions to an execution trace buffer (ETB) as the instructions retire and while the execution engine processes others of the plurality of instructions, wherein the step of writing information comprises writing information based on a pre-selected mode of operation, wherein the step of writing comprises writing macroinstruction address information when operating in a macroinstruction mode and writing micro-ip address when operating in a microinstruction mode; and reading the information from the ETB, wherein the method is implemented in a mixed-architecture processor that processes both microinstructions and macroinstructions, and wherein the step of writing information comprises writing information regarding both microinstructions and macroinstructions.

2. The method of claim 1, wherein the ETB comprises a pointer, which references an entry of the ETB and changes position after the information is written to the ETB.

3. The method of claim 2, wherein the information read from the ETB is issued to a machine-visible register.

4. The method of claim 1, wherein the step of writing information comprises writing address information for each of the instructions as each of the instructions retires.

5. The method of claim 1, wherein the step of writing information comprises writing branch address and branch target information for each macroinstruction that results in a change in program flow.

6. The method of claim 1, wherein the step of writing information comprises:

writing a virtual instruction pointer for each retiring instruction when operating in a retired macroinstruction trace mode;

writing a branch address and a branch target when operating in a retired macro-branch trace mode;

writing micro-ip information for each retiring instruction when operating in a retired microinstruction trace mode; and writing micro-ip information when a non-sequential operation occurs when operating in a retired first micro-ip of new flows trace mode.

7. An execution trace buffer (ETB) for use in debugging a system comprising:

a plurality of registers capable of holding information regarding executed instructions as the instructions are processed, wherein instructions are executed by an execution engine and are retired while the execution engine executes other instructions, and wherein the information stored in the registers varies depending upon a pre-selected mode of operation, and comprises macroinstruction address information when operating in a macroinstruction mode and micro-ip address information when operating in a microinstruction mode;

a pointer identifying a register into which an instruction is written; and a bus connected to the ETB capable of reading the information on the ETB, wherein the ETB is adapted to operate in a mixed-architecture processor that processes both microinstructions and macroinstructions, and wherein the ETB holds information related to microinstructions and macro instructions.

8. The ETB of claim 7, further comprising:

a machine-visible register connected to a bus, to which the information in the ETB may be output.

9. The ETB of claim 7, wherein the ETB receives the instruction information while an execution engine processes a different instruction.

10. The ETB of claim 7, wherein the registers store address information for each instruction retired by an execution engine.

11. The ETB of claim 7, wherein the registers store only branch address and branch target information for each instruction that results in a change of program flow.

12. The ETB of claim 7, wherein the registers store a virtual instruction pointer for each retiring instruction when operating in a retired macroinstruction trace mode, store a branch address and a branch target when operating in a retired macro-branch trace mode, store micro-ip information for each retiring instruction when operating in a retired microinstruction trace mode, and store micro-ip information only when a non-sequential operation occurs when operating in a retired first micro-ip of new flows trace mode.

13. A computer system capable of assisting a user to debug the system comprising:

a retire stage of an execution engine that holds information regarding executed instructions, wherein the execution engine processes both macroinstructions and microinstructions; and an execution trace buffer (ETB) connected to the execution engine, which ETB receives information regarding executed instructions, wherein the information varies depending upon a pre-selected mode of operation, wherein the ETB operates in a macroinstruction mode and in a microinstruction mode, wherein the information comprises macroinstruction address information when operating in the macroinstruction mode and micro-ip address information when operating in the microinstruction mode, and wherein the ETB receives the information while the execution engine processes another instruction.

14. The computer system of claim 13, further comprising:

a machine-visible register connected the ETB, to which the information in the ETB may be output.

15. The computer system of claim 14, wherein the machine-visible register is connected to the ETB by a bus.

16. The computer system of claim 13, wherein the execution engine emulates instructions from an instruction set architecture in a CPU capable of running programs with multiple instruction sets.

17. The computer system of claim 13, wherein the ETB stores address information for each executed instruction.

18. The computer system of claim 13, wherein the ETB stores address information related to branch instructions only, for macroinstructions that result in a change of program flow.

19. The computer system of claim 13, wherein the ETB stores a virtual instruction pointer for each retiring instruction when operating in a retired macroinstruction trace mode, stores a branch address and a branch target when operating in a retired macro-branch trace mode, stores macro-ip information for each retiring instruction when operating in a retired microinstruction trace mode, and stores micro-ip information only when a non-sequential operation occurs when operating in a retired first micro-ip of new flows trace mode.

* * * * *